United States Patent Office 2,860,121
Patented Nov. 11, 1958

2,860,121

STABILIZED COMPOSITIONS COMPRISED OF POLYMERS AND COPOLYMERS OF ACRYLONITRILE AND METHOD FOR THEIR PREPARATION

George W. Stanton and Forrest A. Ehlers, Walnut Creek, Calif., assignors to The Dow Chemical Company, Midland, Mich., a corporation of Delaware No Drawing. Application December 19, 1955
Serial No. 553,702

12 Claims. (Cl. 260—45.9)

This invention relates to improved solid compositions which are essentially comprised of polymers and copolymers of acrylonitrile, containing at least about 60 percent by weight of acrylonitrile in the polymer molecule, and minor proportions of an agent which renders them stable against becoming embrittled or discolored upon exposure to light or heat, or both, and to a method for the preparation of such compositions.

Compositions and articles formed from compositions which are comprised of major proportions of polymers and copolymers of acrylonitrile tend to be undesirably affected in their physical characteristics upon prolonged exposure to light or heat at elevated temperatures, or both. Thus, such compositions are frequently observed to become discolored in appearance or brittle in physical quality, or both, due to the deleterious influence upon them of light or heat, or both. Such behavior limits the adaptability and desirability for employment of such compositions in the manufacture of various molded, shaped and cast articles including, for example, such articles as films, particularly relatively thin films, ribbons, filaments, fibers and the like, wherein embrittlement or discoloration cannot be satisfactorily tolerated. It would be advantageous to provide agents which could be incorporated in solid compositions comprised of polymers and copolymers of acrylonitrile to render them stable to the harmful effects of light or heat, or both, so as to avoid their becoming discolored or brittle upon such exposure. Therefore, it is among the principal objects of the present invention to provide stabilized compositions of the described nature and a method for their preparation.

According to the present invention, a composition comprised of polymers and copolymers of acrylonitrile, containing at least about 60 percent by weight of acrylonitrile in the polymer molecule, may be rendered stable to the deleterious influences of light or heat, or both, by incorporating in the composition minor proportions, in an amount between about 1 and 20, and advantageously between about 5 and 15, percent by weight, of a compound represented by the general formula:

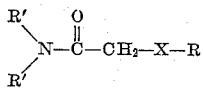

wherein X is selected from the group consisting of oxygen and sulfur; and R and R' may be selected independently from alkyl radicals containing not more than 2 carbon atoms excepting that when X is oxygen and R is a methyl radical not more than a single R' can be a methyl radical. Articles manufactured from compositions which are prepared by incorporating minor proportions within the indicated ranges of such compounds show little, if any, tendency to become discolored upon prolonged exposure to ultraviolet light, and exhibit little of the tendency to become brittle as a result of such exposure, especially when the stabilizing agent is present in amounts of about 5 percent or more by weight of the composition.

In a series of illustrative examples, a copolymer containing about 80 percent by weight of acrylonitrile and about 20 percent by weight of isobutylene in the polymer molecule was prepared in an aqueous emulsion. The copolymer was coagulated from the aqueous emulsion by the addition of a magnesium chloride solution. The coagulum was washed and dried and found to be acetone soluble in dissolved concentrations of at least about 15 percent by weight. In order to evaluate various stabilizing compounds which are useful according to the present invention, a series of solutions of the copolymer in acetone was prepared. In each solution in the series, about 15 percent by weight of the copolymer was dissolved. To each of the solutions, a quantity of each stabilizing compound to be tested was separately added in an amount of about 15 percent by weight of the dissolved copolymer. Thin films were cast from each of the solutions. The films were dried overnight in air, then at about 70° C. for an hour. The resulting films were mounted near the rim of a horizontal turntable, with halves of each film being in exposed and unexposed conditions. The turntable was revolved in a standard Fadeometer for about 120 hours, during which time the exposed portions of the films were subjected to exposure with ultraviolet light. Each of the films was then tested with a photoelectric reflection meter which had been calibrated to a reading of 100 when turned toward a glazed white tile (see footnote). An exposed but untreated film of the copolymer gave readings of about 70 and had a light tan color, while the covered and unexposed portions of all the films gave readings of 90 to 96, using the white tile standard as a background.

Results with several typical compounds according to the present invention are reproduced in the following table:

| Test Compound | Reflection meter reading after 120 hrs. in Fadeometer |
|---|---|
| (Stabilizer): | |
| None | about 70. |
| N,N-diethylmethoxyacetamide | about 90. |
| N,N-dimethylethoxyacetamide | over 90. |
| N,N-diethylethoxyacetamide | over 90. |
| N,N-dimethylmethylthioacetamide | over 90. |

In addition, such compounds as N-methyl-N-ethylmethoxyacetamide, N - ethyl - N - methylethoxyacetamide, N,N-diethyl-methylthioacetamide, N-ethyl-N-methylmethylthioacetamide, N,N-dimethylethylthioacetamide, N,N-diethylthioacetamide, and N-ethyl-N-methylethylthioacetamide are effective in an analogous manner for stabilizing the copolymer.

When a series of films is made containing varying amounts of any of the stabilizers of the invention, and the films are exposed in the Fadeometer in the above described manner, it is found that amounts of about 1 percent or more by weight of the stabilizing agent are sufficient to show significant improvement over untreated films, and that an amount of about 5 percent or more by weight of the stabilizer in the composition gives clear

---

NOTE.—In the Fadeometer which was employed for the tests, two type S-4 General Electric Sunlight lamps were disposed in a horizontal and parallel relationship to one another. The centers of the bulbs were about four inches apart. The bulbs were at a height of about five and three-quarter inches above the turntable and were displaced about six inches from its center. The turntable, was driven at a speed of about thirty-three and one-third revolutions per minute. The reflection meter which was employed was a Model 610 meter made by the Photovolt Corporation of 95 Madison Avenue, New York, N. Y. It was equipped with a tristimulus blue filter and was calibrated to read 100 when turned toward a color standard white ceramic "Vitrolite" tile which was obtained from the Gardner Laboratories of Bethesda, Maryland.

and substantially colorless products. The products which contain 5 or more percent by weight of the stabilizing agents of the present invention are not brittle or are much less brittle than those containing little or none of the stabilizer.

While the invention has been illustrated with respect to tests with a specific copolymer of acrylonitrile, the stabilizing compounds of the present invention are equally useful for protecting compositions comprised of other polymers and copolymers of acrylonitrile which contain at least about 60 percent by weight of acrylonitrile in the polymer molecule. Among such compositions which have been found to exhibit improved properties when treated in accordance with the present invention are those comprised of copolymers of acrylonitrile and methyl acrylate containing about 40 percent by weight of methyl acrylate in the polymer molecule; copolymers of acrylonitrile and vinyl acetate containing about 37.5 percent by weight of vinyl acetate in the polymer molecule; tripolymers of acrylonitrile, isobutylene and allyl alcohol containing about 10 percent by weight of isobutylene and about 4 percent by weight of allyl alcohol in the polymer molecule; copolymers of acrylonitrile and 2-vinyl pyridine containing about 4 percent by weight of 2-vinyl pyridine in the polymer molecule; and copolymers of acrylonitrile and vinyl chloride containing about 15 percent by weight of vinyl chloride in the polymer molecule.

The stabilizing compounds may be incorporated in compositions according to the present invention in various suitable ways including dry-blending the ingredients; mixing the ingredients on compounding rolls and the like; and dispersing the stabilizing compound from solution or suspension onto polymer particles which may be dissolved or suspended for the purpose, followed by evaporation of solvent.

What is claimed is:

1. A solid composition which is resistant to becoming discolored and embrittled upon closure to light and heat which comprises polymers and copolymers of acrylonitrile which contain at least about 60 percent by weight of acrylonitrile in the polymer molecule, any balance being another monoethylenically unsaturated compound copolymerized with acrylonitrile, and between about 1 and 20 percent by weight based on the weight of the polymer, of a stabilizing compound having the general formula:

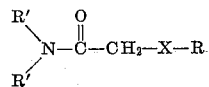

wherein X is selected from the group consisting of oxygen and sulfur; R is selected from the group consisting of methyl and ethyl radicals; and R' is selected from the group consisting of methyl and ethyl radicals excepting that when X is oxygen and R is a methyl radical, not more than a single R' can be a methyl radical.

2. A composition according to claim 1 wherein the stabilizing compound is present in an amount between about 5 and 15 percent by weight, based on the weight of the polymer.

3. A composition according to claim 1 wherein the stabilizing compound is N,N-diethylmethoxyacetamide.

4. A composition according to claim 1 wherein the stabilizing compound is N,N-dimethylethoxyacetamide.

5. A composition according to claim 1 wherein the stabilizing compound is N,N-diethylethoxyacetamide.

6. A composition according to claim 1 wherein the stabilizing compound is N,N-dimethylmethylthioacetamide.

7. A method for stabilizing solid compositions comprising major proportions of polymers and copolymers of acrylonitrile which contain at least about 60 percent by weight of acrylonitrile in the polymer molecule, any balance being another monoethylenically unsaturated compound copolymerized with acrylonitrile, against discoloration and embrittlement from the effects of heat and light which comprises incorporating in the composition between about 1 and 20 percent by weight based on the weight of polymer in the composition, of a stabilizing compound having the general formula:

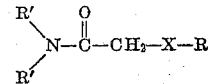

wherein X is selected from the group consisting of oxygen and sulfur; R is selected from the group consisting of methyl and ethyl radicals; and R' is selected from the group consisting of methyl and ethyl radicals excepting that when X is oxygen and R is a methyl radical, not more than a single R' can be a methyl radical.

8. A method according to claim 7 wherein between about 5 and 15 percent by weight, based on the weight of the polymer in the composition, of the stabilizing compound is incorporated in the composition.

9. A method according to claim 7 wherein the stabilizing compound is N,N-diethylmethoxyacetamide.

10. A method according to claim 7 wherein the stabilizing compound is N,N-dimethylethoxyacetamide.

11. A method according to claim 7 wherein the stabilizing compound is N,N-diethylethoxyacetamide.

12. A method according to claim 7 wherein the stabilizing compound is N,N-dimethylmethylthioacetamide.

References Cited in the file of this patent

UNITED STATES PATENTS

| | | |
|---|---|---|
| 2,404,713 | Houtz | July 23, 1946 |
| 2,681,329 | Stanton et al. | June 15, 1954 |
| 2,735,833 | Stanton et al. | Feb. 21, 1956 |

UNITED STATES PATENT OFFICE
CERTIFICATE OF CORRECTION

Patent No. 2,860,121

November 11, 1958

George W. Stanton et al.

It is hereby certified that error appears in the printed specification of the above numbered patent requiring correction and that the said Letters Patent should read as corrected below.

Column 3, line 38, for "closure" read -- exposure --.

Signed and sealed this 2nd day of June 1959.

(SEAL)
Attest:

KARL H. AXLINE
Attesting Officer

ROBERT C. WATSON
Commissioner of Patents